US012738738B2

(12) United States Patent
Yang et al.

(10) Patent No.: US 12,738,738 B2
(45) Date of Patent: Sep. 15, 2026

(54) RAPID SHUTDOWN SYSTEM AND METHOD FOR CONTROLLING THE SAME

(71) Applicant: SUNGROW POWER SUPPLY CO., LTD., Hefei (CN)

(72) Inventors: Yu Yang, Hefei (CN); Jun Xu, Hefei (CN); Qiaodi Chen, Hefei (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 450 days.

(21) Appl. No.: 18/279,345

(22) PCT Filed: Jan. 10, 2022

(86) PCT No.: PCT/CN2022/070932
§ 371 (c)(1),
(2) Date: Aug. 29, 2023

(87) PCT Pub. No.: WO2022/193804
PCT Pub. Date: Sep. 22, 2022

(65) Prior Publication Data

US 2024/0136817 A1 Apr. 25, 2024
US 2024/0235192 A9 Jul. 11, 2024

(30) Foreign Application Priority Data

Mar. 18, 2021 (CN) ......................... 202110290217.0

(51) Int. Cl.
*H02J 3/007* (2026.01)
*H02J 3/14* (2026.01)
(Continued)

(52) U.S. Cl.
CPC ................ *H02J 3/007* (2020.01); *H02J 3/14* (2013.01); *H02J 3/1878* (2013.01); *H02J 3/381* (2013.01); *H02J 2101/24* (2026.01)

(58) Field of Classification Search
CPC .... H02J 3/324; H02J 3/38; H02J 3/001; H02J 3/007; H02J 3/14; H02J 3/381; H02J 2300/24
See application file for complete search history.

(56) References Cited

U.S. PATENT DOCUMENTS

2014/0159504 A1* 6/2014 Vogt ........................ H02J 3/381 307/109
2015/0381108 A1* 12/2015 Höft ........................ H02S 50/00 361/91.1

(Continued)

FOREIGN PATENT DOCUMENTS

CN 206611172 U 11/2017
CN 111478290 A 7/2020

(Continued)

OTHER PUBLICATIONS

International Search Report (English and Chinese) and Written Opinion of the ISA (Chinese) issued in PCT/CN2022/070932, mailed Mar. 16, 2022; ISA/CN.

(Continued)

*Primary Examiner* — Gustavo A Rosario-Benitez
(74) *Attorney, Agent, or Firm* — Harness, Dickey & Pierce, P.L.C.

(57) ABSTRACT

A rapid shutdown system and a method for controlling the rapid shutdown system are provided. For each of shutdown devices in the rapid shutdown system, an electrical signal disturbance is applied to a direct current bus connected to the shutdown device at least once within each pre-shutdown period of the shutdown device, by an inverter in the rapid shutdown system operating in a mode of limited power output. Then, the shutdown device samples its input parameter and/or output parameter and determines, based on the sampled input parameter and/or the sampled output parameter, whether the electrical signal disturbance applied to the (Continued)

direct current bus meets a preset condition. The shutdown device switches itself on or remains in an ON state in response to a determination result that the electrical-signal disturbance already meets the preset condition.

17 Claims, 13 Drawing Sheets

(51) Int. Cl.

| | |
|---|---|
| ***H02J 3/1878*** | (2026.01) |
| ***H02J 3/38*** | (2026.01) |
| ***H02J 101/24*** | (2026.01) |

(56) References Cited

U.S. PATENT DOCUMENTS

| | | | | |
|---|---|---|---|---|
| 2016/0329715 | A1* | 11/2016 | Orr | H02S 50/10 |
| 2019/0074684 | A1 | 3/2019 | Craciun et al. | |
| 2019/0326757 | A1* | 10/2019 | Yao | H02J 3/46 |
| 2020/0106272 | A1* | 4/2020 | Yu | H02S 40/32 |
| 2020/0235583 | A1* | 7/2020 | Eizips | H02M 3/1588 |
| 2020/0303949 | A1* | 9/2020 | Pauletti | H10F 19/00 |
| 2021/0391710 | A1 | 12/2021 | Yang et al. | |
| 2022/0216786 | A1* | 7/2022 | Yang | H02M 3/156 |
| 2022/0285973 | A1* | 9/2022 | Zhang | H02J 7/35 |
| 2023/0126969 | A1 | 4/2023 | Yang et al. | |

FOREIGN PATENT DOCUMENTS

| | | | |
|---|---|---|---|
| CN | 111585307 | A | 8/2020 |
| CN | 111585308 | A | 8/2020 |
| CN | 112332536 | A | 2/2021 |
| CN | 112803485 | A | 5/2021 |
| EP | 4167422 | A1 | 4/2023 |

OTHER PUBLICATIONS

First Office Action issued in CN 202110290217.0 (Chinese with English summary), dated Dec. 26, 2022.

* cited by examiner

RAPID SHUTDOWN SYSTEM AND METHOD FOR CONTROLLING THE SAME

The present application is a U.S. National Phase Application of International Patent Application PCT/CN2022/070932, titled "PHOTOVOLTAIC QUICK TURN-OFF SYSTEM AND CONTROL METHOD THEREFOR" filed on Jan. 10, 2022 which claims priority to Chinese Patent Application No. 202110290217.0, titled "RAPID SHUTDOWN SYSTEM AND METHOD FOR CONTROLLING THE SAME", filed on Mar. 18, 2021 with the China National Intellectual Property Administration, each of which are incorporated herein by reference in their entirety.

FIELD

The present disclosure relates to the technical field of photovoltaic systems, and in particular to a rapid shutdown system, and a method for controlling the rapid shutdown system.

BACKGROUND

In the conventional technology, it is necessary for a rapid shutdown system to protect a worker from an output of a photovoltaic string even if a single element or module malfunctions, and which is achieved based on heartbeat mechanism as follows. A conduction signal is constantly transmitted to a shutdown device in the rapid shutdown system, so that the shutdown device is on. The shutdown device switches itself into a mode of limited power output in response to its failure to receive the conduction signal, and is disconnected from a photovoltaic module connected to the shutdown device.

In practice, however, the conduction signal for the shutdown device to be on is transmitted in a form of a communication signal which is prone to attenuation or interference under harsh conditions. For example, the communication signal transmitted through a relatively long direct current cable is prone to attenuation, and a carrier signal transmitted through a power line involving switching noise is prone to interference. The shutdown device in the rapid shutdown system fails to receive the conduction signal suffering from attenuation or interference, and afterwards switches itself into the mode of limited power output. That is, the shutdown device is mistakenly switched off, resulting in undervoltage at a direct current input terminal of a converter in the system and further shutdown of the converter.

The converter that was shut down spends a period of time on a power-on self-test before resuming operating, and unstable communication signals may results in erroneous shutdown in some cases, which lowers electricity production of a photovoltaic system. In addition, an additional signal transmission device is essential for each photovoltaic string in order to start the shutdown device by means of communications such as PLC, resulting in high cost of the photovoltaic system In order to solve the above problems, the rapid shutdown system is currently started as follows. A current or voltage disturbance is constantly applied to a direct current bus, so that the shutdown device is on. Therefore, it is unnecessary for the shutdown device to constantly receive the heartbeat transmitted by a central controller, reducing a total cost of the rapid shutdown system. However, an inverter that is operating in a mode of limited power output is not allowed to output the current or voltage disturbance constantly to the direct current bus in order to prevent the inverter from outputting power exceeding its power limit.

SUMMARY

A rapid shutdown system and a method for controlling the rapid shutdown system are provided according to the present disclosure. A shutdown device can remain in an ON state while an inverter that is operating in a mode of limited power output outputs power not exceeding its power limit, thereby avoiding the decrease in electricity production and malfunction of the photovoltaic system resulted from the shutdown device switching itself off mistakably, without incurring additional costs of the system.

In order to achieve the above objectives, the following technical solutions are provided according to the present disclosure.

A method for controlling a rapid shutdown system is provided in a first aspect of the present disclosure. The method includes: applying an electrical signal disturbance to a direct current bus connected to a shutdown device in the rapid shutdown system at least once within each pre-shutdown period of the shutdown device, by an inverter in the rapid shutdown system operating in a mode of limited power output; sampling an input parameter and/or an output parameter of the shutdown device by the shutdown device and determining, by the shutdown device based on the sampled input parameter and/or the sampled output parameter, whether the electrical signal disturbance applied to the direct current bus meets a preset condition; and switching the shutdown device on or maintaining the shutdown device in an ON state, in response to a determination result that the electrical-signal disturbance already meets the preset condition.

In an embodiment, the inverter is a single-stage inverter including only an inverter circuit, and the applying the electrical signal disturbance to the direct current bus connected to the shutdown device in the rapid shutdown system at least once within the pre-shutdown period of the shutdown device includes: applying the electrical signal disturbance to the direct current bus connected to the shutdown device in the rapid shutdown system at least once within the pre-shutdown period by the inverter circuit under control of the inverter.

In an embodiment, the inverter is a two-stage inverter including a Boost circuit and an inverter circuit, and the applying the electrical signal disturbance to the direct current bus connected to the shutdown device in the rapid shutdown system at least once within the pre-shutdown period of the shutdown device includes: sampling a voltage across a direct current bus of the inverter and determining whether the sampled voltage is greater than a preset voltage by the inverter; operating the Boost circuit in a shoot through mode under control of the inverter and applying the electrical signal disturbance to the direct current bus connected to the shutdown device in the rapid shutdown system at least once within the pre-shutdown period by the inverter circuit under control of the inverter, in response to a determination result that the voltage is greater than the preset voltage; and applying the electrical signal disturbance to the direct current bus connected to the shutdown device in the rapid shutdown system at least once within the pre-shutdown period by the Boost circuit under control of the inverter, in response to a determination result that the voltage is not greater than the preset voltage.

In an embodiment, the method further includes: stopping outputting a PWM signal or performing an output at a preset duty ratio throughout a sub-period of time within the pre-shutdown period while applying the electrical signal disturbance to the direct current bus connected to the shutdown device in the rapid shutdown system at least once within the pre-shutdown period by the Boost circuit under control of the inverter, where the electrical signal disturbance is not applied during the period of time.

In an embodiment, the applying the electrical signal disturbance to the direct current bus connected to the shutdown device in the rapid shutdown system at least once within the pre-shutdown period by the inverter circuit under control of the inverter includes: feeding a current to a grid at least once within the pre-shutdown period by the inverter circuit, to charge or discharge a bus capacitor in the inverter, as so to apply the electrical signal disturbance to the direct current bus connected to the shutdown device in the rapid shutdown system.

In an embodiment, the current fed into the grid by the inverter circuit has a same phase as a voltage of the grid.

In an embodiment, the current fed into the grid corresponds to a full period, or a positive half-period and/or a negative half-period of a sine wave.

In an embodiment, a preset duration, and at least one of the number of times, a frequency and an amplitude of the electrical signal disturbance applied by the inverter within the pre-shutdown period depend on a power limit set for the inverter in the mode of limited power output.

In an embodiment, the electrical signal disturbance is a current signal disturbance and/or a voltage signal disturbance, or the electrical signal disturbance is a power signal disturbance.

In an embodiment, the method further includes: maintaining the shutdown device in an OFF state in response to a determination result that the electrical signal disturbance does not meet the preset condition after the sampling the input parameter and/or the output parameter of the shutdown device by the shutdown device and determining, by the shutdown device based on the sampled input parameter and/or the sampled output parameter, whether the electrical-signal disturbance applied to the direct current bus connected to the shutdown device meets the preset condition.

A rapid shutdown system is further provided in a second aspect of the present disclosure. The system includes an inverter and at least one photovoltaic string. For each of the at least one photovoltaic string, input terminals of shutdown devices in the photovoltaic string are connected to respective photovoltaic modules, output terminals of the shutdown devices are connected in series to form two terminals of the photovoltaic string, and the two terminals of the photovoltaic string are connected to a direct current end of the inverter through a direct current bus. An alternating current end of the inverter is connected to a grid. The inverter is configured to perform, cooperating with each of the shutdown devices, the method in the first aspect.

In an embodiment, the inverter is a single-stage inverter and includes a controller, an inverter circuit, a bus capacitor, and at least one driving circuit. Two terminals of the bus capacitor are connected to respective input terminals of the inverter circuit through a direct current bus of the inverter. An output end of the inverter circuit serves as the alternating current end of the inverter. An output terminal of the driving circuit is connected to control terminals of respective switch transistors in the inverter circuit. The controller is communicatively connected to the driving circuit, and is configured to send a control instruction to the driving circuit for the driving circuit to output a drive signal to the switch transistors.

In an embodiment, the inverter is a two-stage inverter and further includes at least one Boost circuit. Input terminals of the Boost circuit serve as a pair of direct current terminals of the inverter, and a positive output terminal and a negative output terminal of the Boost circuit are connected to two terminals of the bus capacitor respectively. The controller is connected to a control terminal of a switch transistor in the Boost circuit through the driving circuit.

In an embodiment, the inverter is single-phase or three-phase.

In the method for controlling the rapid shutdown system according to the embodiments of the present disclosure, for each of shutdown devices in the rapid shutdown system, an electrical signal disturbance is applied to a direct current bus connected to the shutdown device at least once within each pre-shutdown period of the shutdown device, by an inverter in the rapid shutdown system operating in a mode of limited power output. Then, the shutdown device samples its input parameter and/or output parameter and determines, based on the sampled input parameter and/or the sampled output parameter, whether the electrical signal disturbance applied to the direct current bus meets a preset condition. The shutdown device switches itself on or remains in the ON state in response to a determination result that the electrical-signal disturbance already meets the preset condition. That is, with the method for controlling the rapid shutdown system according to the embodiments of the present disclosure, the inverter that is operating in the mode of limited power output applies the electrical signal disturbance to the direct current bus at intervals, so that the shutdown device can remain in the ON state, thereby not only avoiding a decrease in electricity production and malfunction of the photovoltaic system resulted from shutdown and power-on self-test of the inverter after the shutdown device switching itself off mistakably but also preventing the inverter from constantly applying the electrical signal disturbance to the direct current bus, i.e., outputting power exceeding the power limit in the mode of limited power output. Moreover, the inverter can output a maximum power of the photovoltaic system immediately after the mode of limited power output ends.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely used for describing some embodiments of the present disclosure, and those skilled in the art may obtain other drawings according to the provided drawings without any creative effort.

DETAILED DESCRIPTION OF EMBODIMENTS

Technical solutions of embodiments of the present disclosure are described completely and clearly below in conjunction with the drawings of the embodiments of the present disclosure. Apparently, the embodiments described below are only some rather than all of the embodiments of the present disclosure. Any other embodiments obtained by those skilled in the art based on the embodiments in the present disclosure without any creative effort fall within the protection scope of the present disclosure.

In the present disclosure, terms "include", "comprise" or any other variants are intended to be non-exclusive. Therefore, a process, method, article or device including a series of elements includes not only the listed elements but also other elements that are not enumerated, or further include elements inherent in the process, method, article or device. Unless expressively limited otherwise, a process, method, article or device limited by "comprising/including a(n) . . . " does not exclude existence of another identical element in such process, method, article or device.

Standards for photovoltaic inverter systems are increasingly detailed as the gird-connected photovoltaic systems become widespread throughout the world. In order to secure and stabilize the photovoltaic inverter system, countries have set a series of industry standards for photovoltaic inverters on installation requirements, control requirements, verification requirements and the like. AS-NZS 4777.1-2016 of Australia/New Zealand standard stipulates that a photovoltaic inverter should impose limits on power fed into the grid. These limits are categorized into: 1) hard limits, that is, a grid-connected inverter is disconnected from the grid; and 2) soft limits, that is, the grid-connected inverter outputs power below the power limit.

In the existing solution that the inverter constantly applies a current or voltage disturbance to the direct current bus so that the shutdown device remains in an ON state, only a disturbance reaching a certain amplitude is detectable due to the limitation of the detection accuracy of the shutdown device. The inverter, when operating in the mode of limited power output with a small power limit, for example, 1% of a rated power 33 kW, i.e., 300 W, outputs, most likely, power exceeding the power limit in order to constantly produce the disturbance, failing to meet the industry standards.

In view of this, a method for controlling a rapid shutdown system is provided according to an embodiment of the present disclosure so that the shutdown device remains in the ON state and an inverter in the rapid shutdown system outputs power not exceeding a power limit when operating in the mode of limited power output, thereby avoiding a decrease in electricity production and malfunction of the photovoltaic system resulted from shutdown and power-on self-test after the shutdown device switching itself off mistakably, without incurring additional costs of the system.

Figure 1:
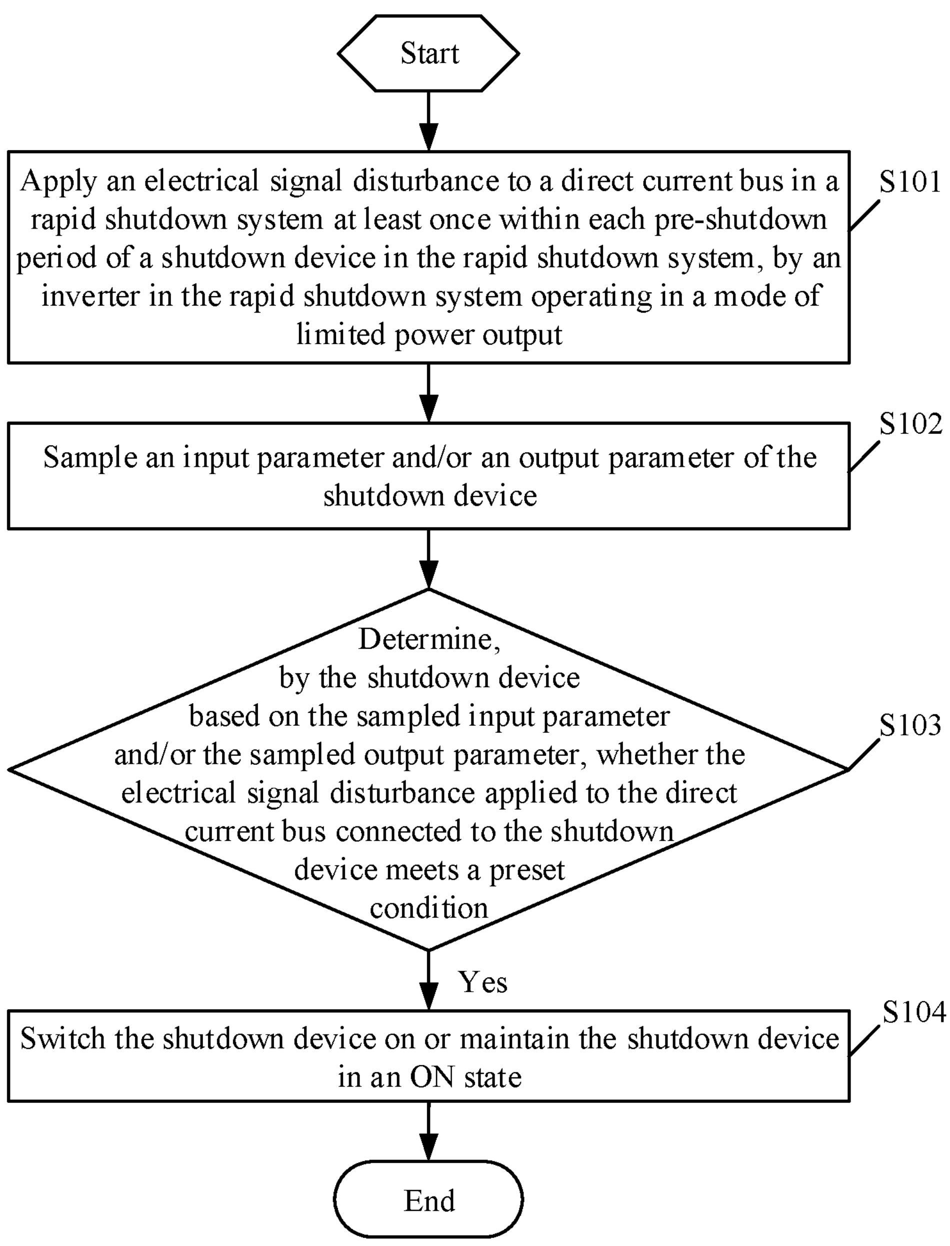
FIG. 1 is a flowchart illustrating a method for controlling a rapid shutdown system according to an embodiment of the present disclosure.

The method is as shown in FIG. 1, and includes the following steps S101 to S104.

In step S101, an inverter in the rapid shutdown system, when operating in a mode of limited power output, applies an electrical signal disturbance to a direct current bus in the rapid shutdown system at least once in each pre-shutdown period of a shutdown device in the rapid shutdown system.

The inverter that is operating in the mode of limited power output is not allowed to constantly apply an electrical signal disturbance detectable by the shutdown device in order for the shutdown device to remain in the ON state simultaneously with an average outputted power less than a power limit.

Therefore, the inverter in the rapid shutdown system, when operating in the mode of limited power output, applies the electrical signal disturbance to the direct current bus at intervals. In practice, each shutdown device in the rapid shutdown system that is arranged at a front end of the inverter is provided with the pre-shutdown period. The shutdown device switches itself off in response to its failure to receive the electrical signal disturbance throughout the pre-shutdown period, that is, the failure to receive the conduction signal in the conventional technology. That is, the pre-shutdown period refers to a period of time from a time instant when the shutdown device that is on receives the electrical signal disturbance for the last time to a time instant when the shutdown device switches itself off. In this way, the shutdown device can remain in the ON state owing to the intermittent disturbance applied by the inverter. That is, the inverter applies the electrical signal disturbance to the direct current bus in the rapid shutdown system at least once in each pre-shutdown period of the shutdown device. Therefore, the shutdown device can remain in the ON state while preventing the inverter from outputting power exceeding the power limit since the intermittent and short-duration electrical signal disturbance is applied to the direct current bus.

It should be noted that the electrical signal disturbance includes a current signal disturbance, a voltage signal disturbance, both a current signal disturbance and a voltage signal disturbance, or a power signal disturbance, depending on practical scenarios. In addition, at least one of the number of times, a frequency and an amplitude of the electrical signal disturbance applied by the inverter in the pre-shutdown period as well as a preset duration of the electrical signal disturbance are related to the power limit for the inverter operating in the mode of limited power output. For example, in a case that the power limit is large, the preset duration is lengthened or at least one of the number of times, the frequency and the amplitude of the disturbance is increased in the pre-shutdown period. In a case that the power limit value is small, the preset duration is shortened or at least one of the number of times, the frequency and the amplitude of the disturbance is reduced in the pre-shutdown period. The present disclosure is not limited thereto. All solutions that the inverter applies the electrical signal disturbance to the direct current bus at least once in each pre-shutdown period and the shutdown device successfully receives the conduction signal before switching itself off fall within the protection scope of the present disclosure.

The method proceeds to step S102 after the inverter applies the electrical signal disturbance to the direct current bus in the rapid shutdown system at least once within the pre-shutdown period of the shutdown device arranged at the front end of the inverter.

In step S102, the shutdown device samples an input parameter and/or an output parameter of the shutdown device.

It should be noted that since output terminals of shutdown devices are connected in series, the output parameter of the shutdown device is affected by division of a change in a voltage across the direct current bus in the rapid shutdown system and a change of a current flowing through the direct current bus. In addition, due to structural features of the shutdown device, the input parameter of the shutdown device changes with the change in the output parameter of the shutdown device. Therefore, whether there is an electrical signal disturbance detectable by the shutdown device on the direct current bus can be determined by sampling the input parameter and/or output parameter of the shutdown device.

In step S103, the shutdown device determines, based on the sampled input parameter and/or output parameter, whether the electrical signal disturbance applied to the direct current bus connected to the shutdown device meets a preset condition.

The preset condition may be a preset threshold. For example, the electrical signal disturbance is a current signal disturbance, and it is determined that the electrical signal disturbance already meets the preset condition when the current signal disturbance is greater than a current threshold. The present disclosure is not limited thereto. For a voltage signal disturbance or a power signal disturbance, a threshold for determination may be set by those skilled in the art according to actual situations.

The method proceeds to step S104 in response to a determination result that the electrical signal disturbance already meets the preset condition.

In step S104, the shutdown device switches itself on or remains in the ON state.

The determination result that the electrical-signal disturbance already meets the preset condition in step S103 indicates that the electrical signal disturbance applied by the inverter is detectable by the shutdown device and meets the preset condition, so that the shutdown device that is off switches itself on and the shutdown device that is on remains in the ON state.

In addition, the shutdown device remains in an OFF state in response to a determination result that the electrical signal disturbance does not meet the preset condition in step S103.

Therefore, with the method for controlling the rapid shutdown system according to the embodiments of the present disclosure, the inverter that is operating in the mode of limited power output applies the electrical signal disturbance to the direct current bus at intervals, so that the shutdown device can remain in the ON state, thereby not only avoiding the decrease in electricity production and malfunction of the photovoltaic system resulted from the shutdown device switching itself off mistakably but also preventing the inverter from constantly applying the electrical signal disturbance to the direct current bus, i.e., outputting power exceeding the power limit. Moreover, the method is performed when the inverter operates in the mode of limited power output so that the shutdown device can remain in the ON state, and then the inverter can output a maximum power of the photovoltaic system immediately after the mode of limited power output ends. In addition, the method is performed with no communication means like PLC, thereby reducing the cost of the system.

It should be noted that the inverter in the rapid shutdown system according to the embodiments of the present disclosure may be a single stage inverter or a two-stage inverter. Therefore, the inverter applies the electrical signal disturbance to the direct current bus in the rapid shutdown system at least once in the pre-shutdown period of the shutdown device arranged at the front end of the inverter in the following two cases.

Figure 2:
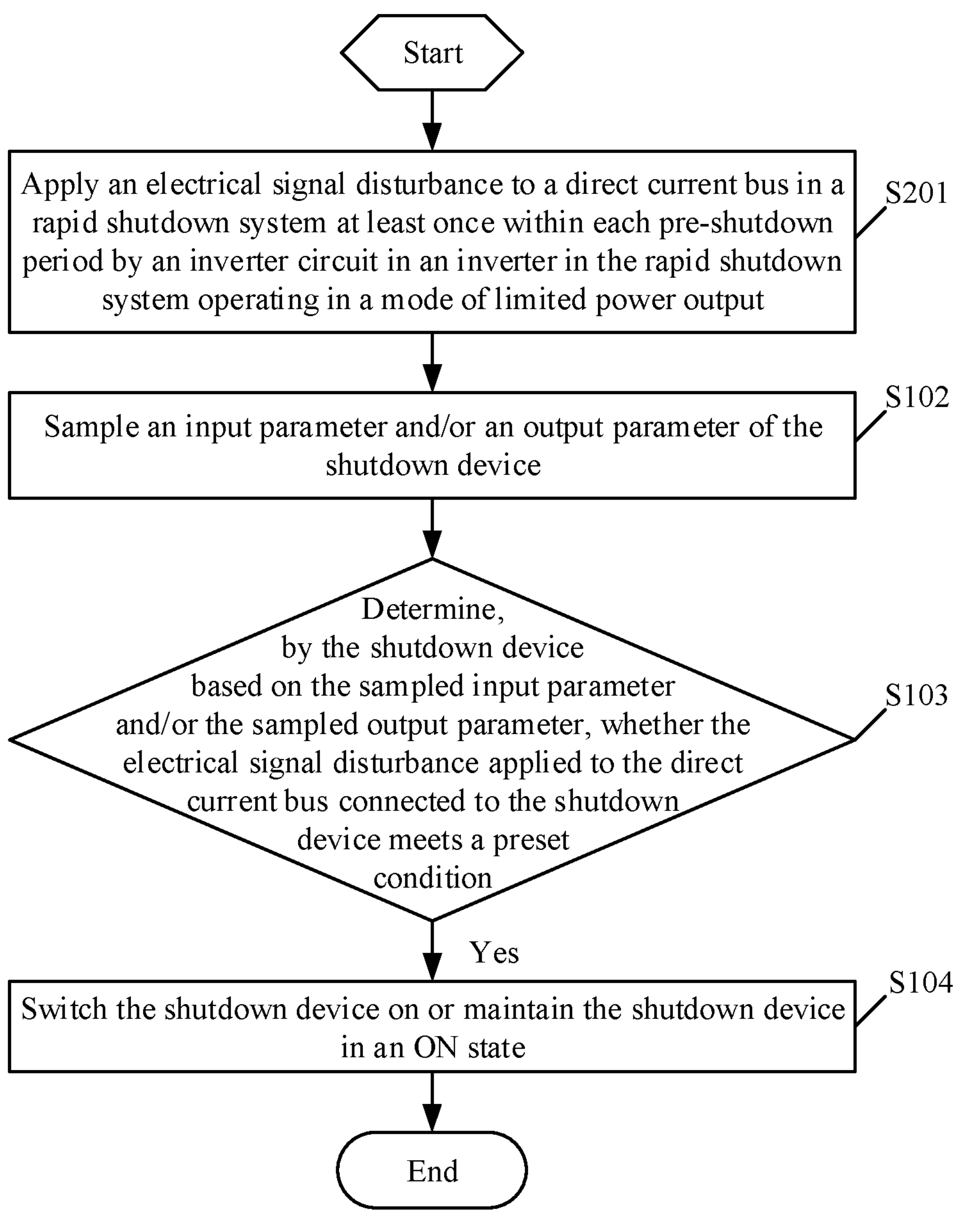
FIG. 2 is a flowchart illustrating of the method for controlling the rapid shutdown system according to another embodiment of the present disclosure.

In a first case, the inverter is the single stage inverter, that is, the inverter includes only an inverter circuit (i.e. a DC/AC circuit) and no Boost circuit. Step S101 is implemented as the following step S201, as shown in FIG. 2.

In step S201, the inverter circuit in the inverter applies, under control of the inverter, the electrical signal disturbance to the direct current bus in the rapid shutdown system at least once within the pre-shutdown period.

Figure 3:
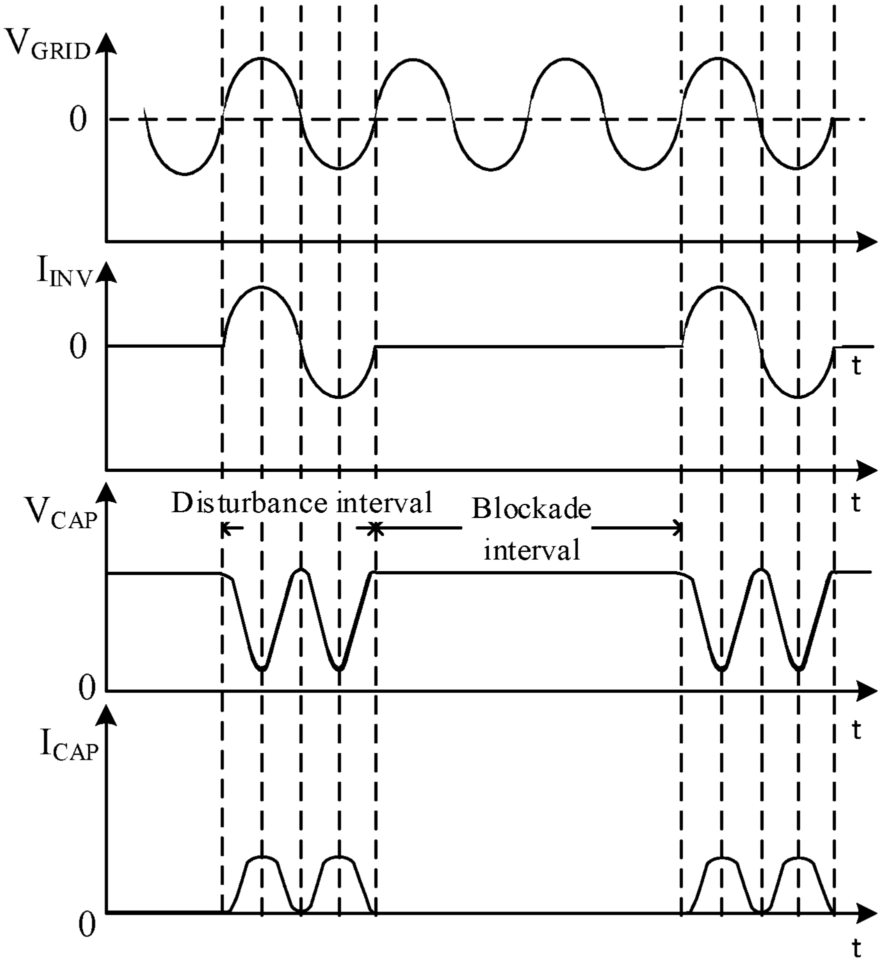
FIG. 3 to FIG. 6 each are a diagram illustrating a waveform of a current fed into a grid by an inverter circuit in an inverter when applying an electrical signal disturbance in the method for controlling the rapid shutdown system according to an embodiment of the present disclosure.
Figure 4:
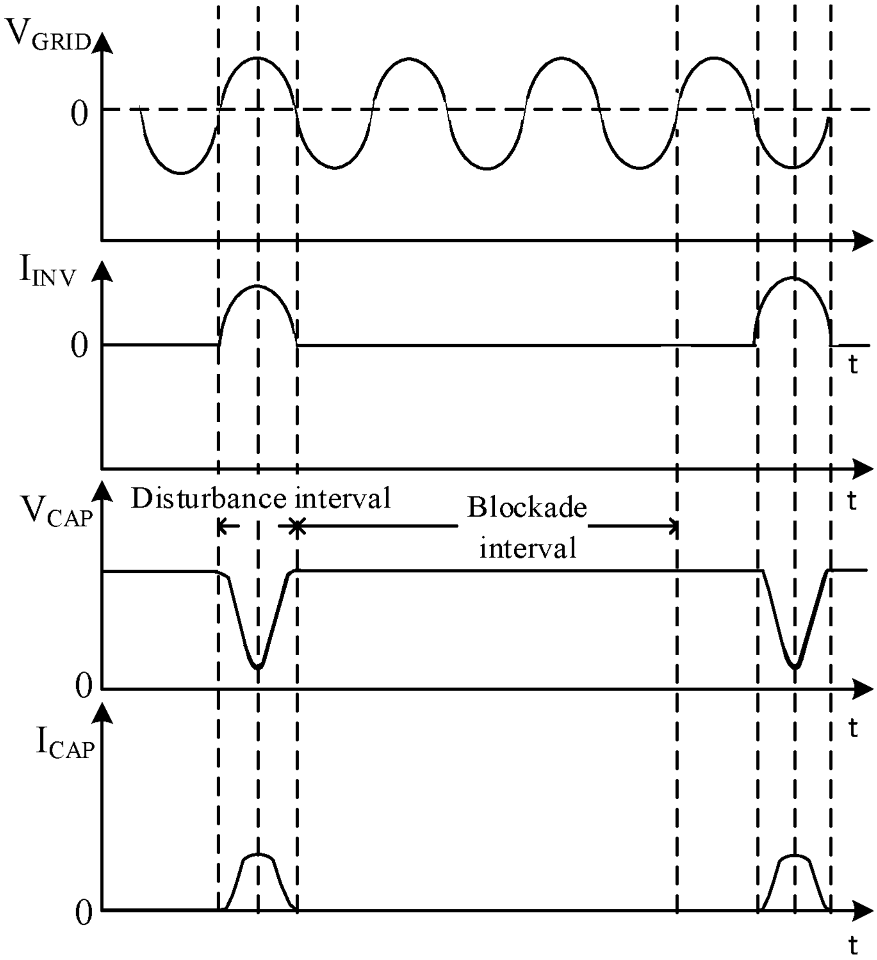
Figure 5:
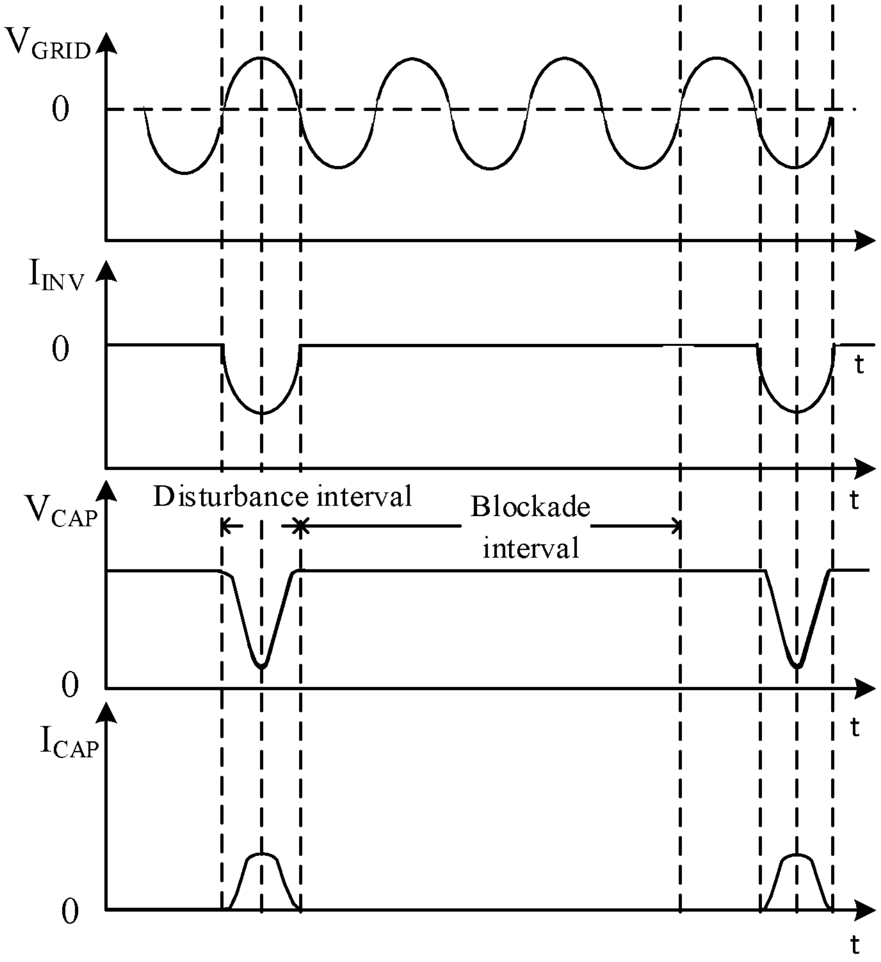
Figure 6:
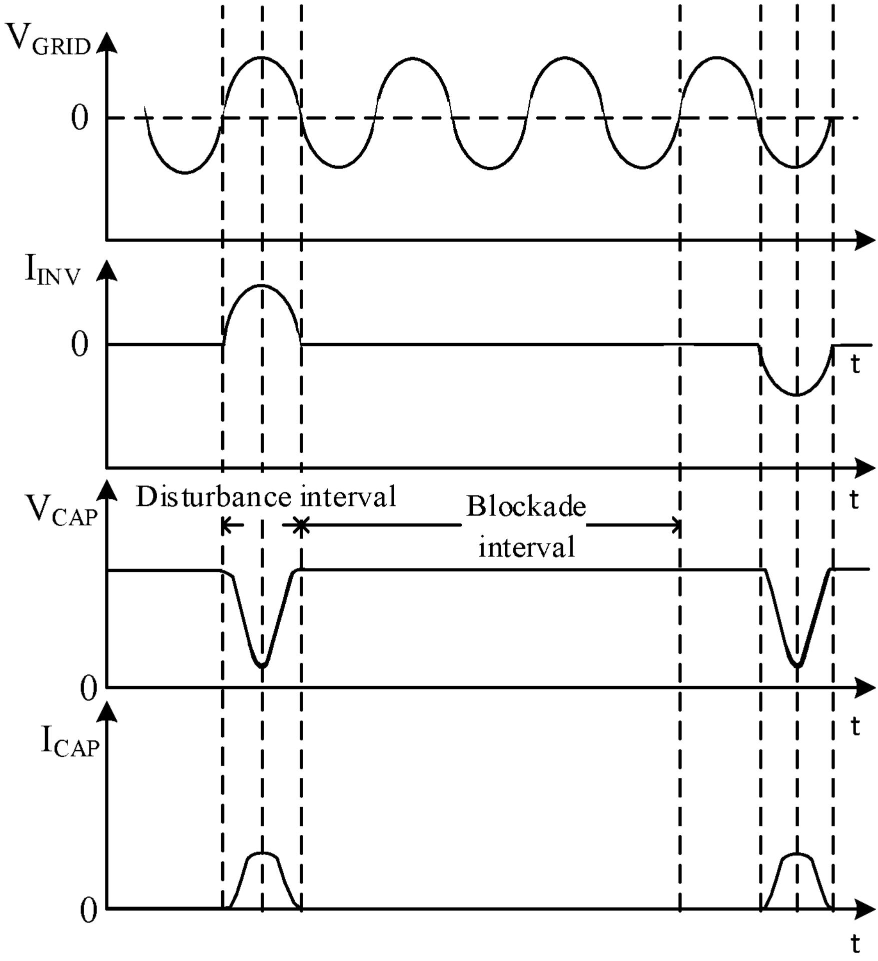

In order to apply the electrical signal disturbance, the inverter controls its inverter circuit to feed a current ($I_{INV}$ as shown in FIG. 3 to FIG. 6) to a grid at least once within the shutdown state entry cycle, so that a bus capacitor in the inverter is charged or discharged. Accordingly, a capacitor voltage VCAP and a capacitor current $I_{CAP}$ fluctuate, as shown in FIG. 3. In this way, the electrical signal disturbance is applied to the direct current bus. In an embodiment, the current fed into the grid is a sine wave, for example, $I_{INV}$ as shown in FIG. 3. In another embodiment, the current fed into the grid corresponds to a positive half period of a sine wave, for example, $I_{INV}$ as shown in FIG. 4. In another embodiment, the current fed into the grid corresponds to a negative half period of a sine wave, for example, $I_{INV}$ as shown in FIG. 5. In another embodiment, the current fed into the grid corresponds both a positive half period and a negative half period of a sine wave, for example, $I_{INV}$ as shown in FIG. 6. Further, the waveform $I_{INV}$ has the same phase as a grid voltage $V_{GRID}$ for each of the waveforms as shown in FIG. 3 to FIG. 6. It should be noted that the number of times, the frequency, the amplitude and the disturbance interval of each of the waveforms $I_{INV}$ in FIG. 3 to FIG. 6 may be set by those skilled in the art according to actual situations.

Figure 7:
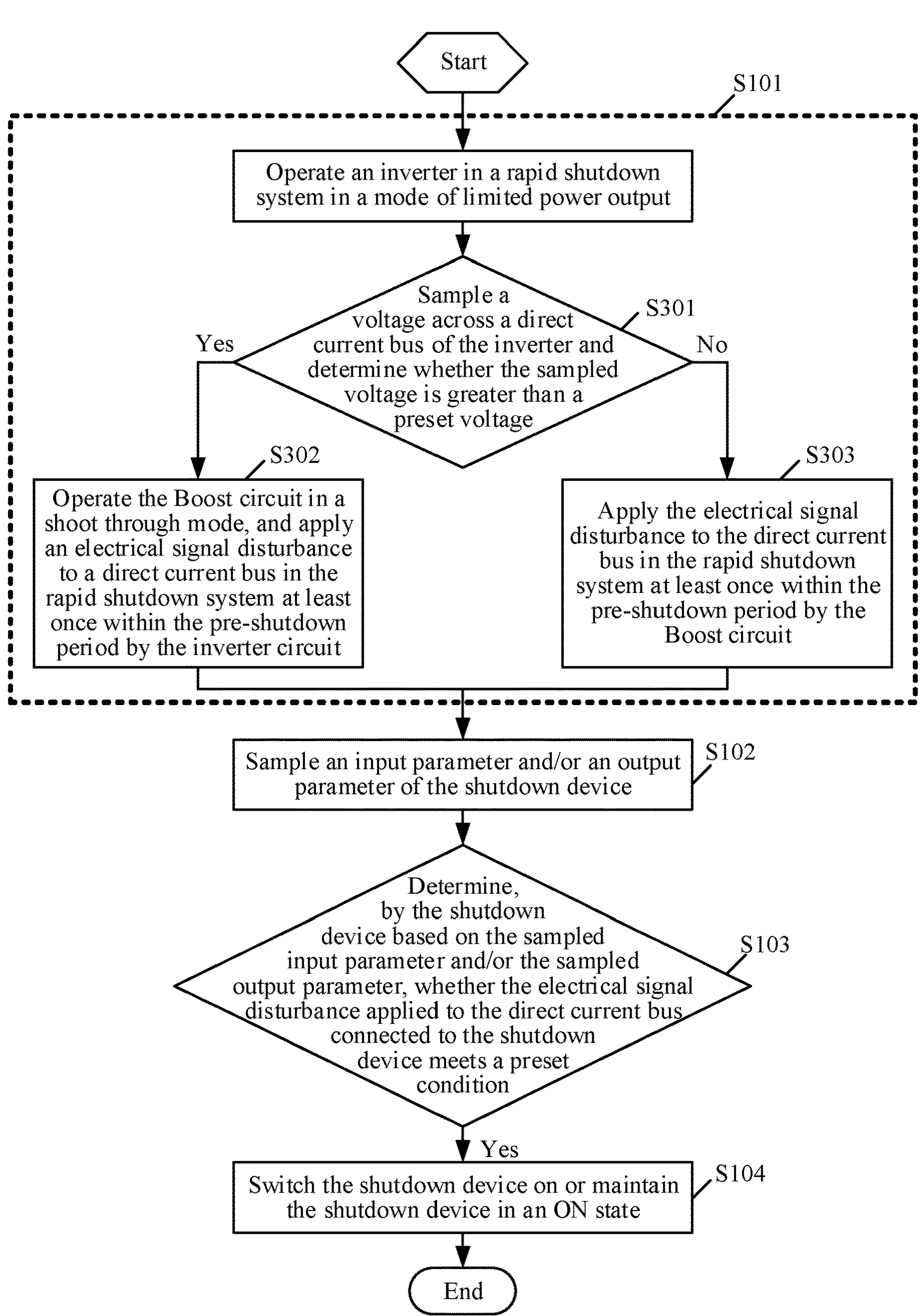
FIG. 7 is a flowchart illustrating the method for controlling the rapid shutdown system according to another embodiment of the present disclosure.

In a second case, the inverter is the two-stage inverter, that is, the inverter includes both an inverter circuit and at least one Boost circuit. Step S101 in which the inverter applies the electrical signal disturbance to the direct current bus in the rapid shutdown system at least once within the pre-shutdown period of the shutdown device arranged at the front end of the inverter, as shown in FIG. 7, includes the following steps S301 to S303.

In step S301, the inverter samples a voltage across a direct current bus of the inverter and determines whether the sampled voltage is greater than a preset voltage.

Theoretically, the electrical signal disturbance may be applied by either the inverter circuit or the Boost circuit in the inverter in a case that the inverter is the two-stage inverter. However, in order to protect a switch transistor in the Boost circuit, the inverter samples the voltage across the direct current bus of the inverter and determines whether the sampled voltage is greater than the preset voltage, so as to determine which one of the inverter circuit and the Boost circuit to apply the electrical signal disturbance. The preset voltage may be set by those skilled in the art according to practical situations. For example, the preset voltage is 600V, the switch transistor in the Boost circuit can operate when the voltage across the direct current bus is less than 600V, and therefore the Boost circuit is determined to apply the electrical signal disturbance. In addition, when the voltage across the direct current bus is greater than 600V, the switch transistor in the Boost circuit is not allowed to operate in order to be protected. That is, the Boost circuit operates in a shoot through mode, and the inverter circuit is determined to apply the electrical-signal disturbance in this case. That is, the method proceeds to step S302 in response to a determination result that the voltage is greater than the preset voltage in step S301, and proceeds to step S303 in response to a determination result that the voltage is not greater than the preset voltage in step S301.

In step S302, the Boost circuit operates in the shoot through mode under control of the inverter, and the inverter circuit applies the electrical-signal disturbance to the direct current bus in the rapid shutdown system at least once within the pre-shutdown period under control of the inverter.

Details about the inverter circuit in the inverter applying the electrical signal disturbance when the Boost circuit in the inverter operates in the shoot through mode are the same as step S201, and thus are not described here.

In step S303, the inverter controls the Boost circuit to apply the electrical signal disturbance to the direct current bus in the rapid shutdown system at least once within the pre-shutdown period.

Figure 8:
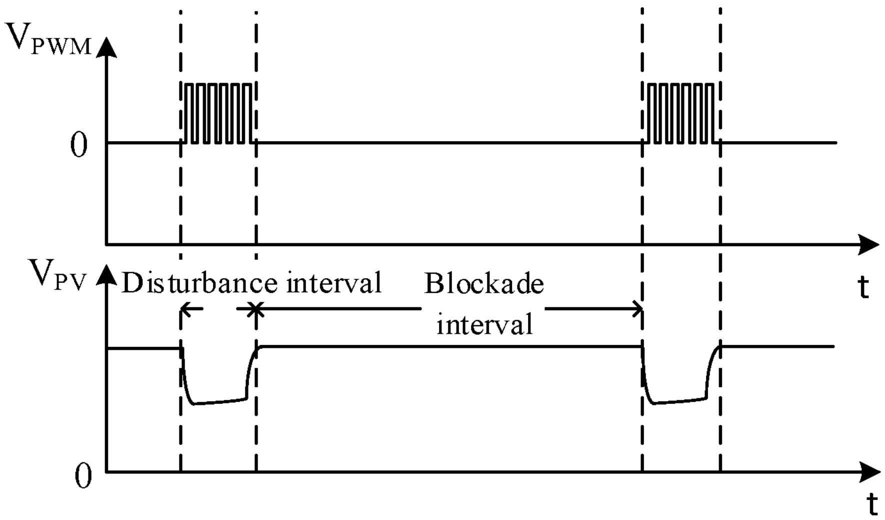
FIG. 8 and FIG. 9 each are a diagram illustrating waveforms of a voltage across a direct current bus and a voltage for driving a Boost circuit when applying an electrical signal disturbance by the Boost circuit in the method for controlling the rapid shutdown system according to an embodiment of the present disclosure.

Details about step S303 are as follows. The inverter controls the Boost circuit to charge or discharge the bus capacitor, and then a voltage PV, $V_{PV}$ as shown in FIG. 8, across the direct current bus in the rapid shutdown system fluctuates. In addition, a phase involved in this fluctuation unnecessarily has the same phase as the grid. Moreover, in order to prevent the inverter from outputting power exceeding the power limit, the Boost circuit stops outputting a PWM signal, i.e., corresponding to a blockade interval as shown in FIG. 8, immediately after outputting the PWM signal for a period of time. Within the next pre-shutdown period, the Boost circuit resumes outputting the PWM signal, and stops outputting the PWM signal when the period of time elapses. A waveform in this case is shown as $V_{PWM}$ in FIG. 8. FIG. 8 shows only an example of embodiments of the present disclosure, and the present disclosure is not limited thereto, as long as the electrical signal disturbance can be applied to the direct current bus in the rapid shutdown system at least once within each pre-shutdown period.

Figure 9:
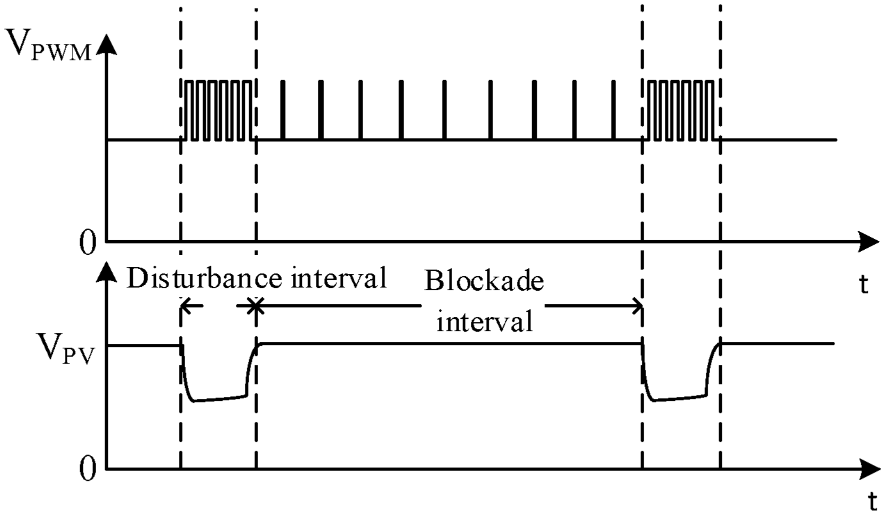

In addition, in step S303, the inverter further controls the Boost circuit to stop outputting the PWM signal (as shown in FIG. 8) or to perform outputting at a preset duty ratio (as shown in FIG. 9) throughout a period of time during which no electrical signal disturbance is applied, i.e., the blockade interval, within each pre-shutdown period, so as to prevent the inverter from outputting power exceeding the power limit. FIG. 9 illustrates only an example of embodiments of the present disclosure, and the present disclosure is not limited thereto. The preset duty ratio depends on actual situations. That is, how often and how long the Boost circuit generates the disturbance is adapted to the power outputted by the inverter. For a large power limit, the Boost circuit generates the disturbance lasting for a long period of time, or at least at a large rate, a high frequency and a large amplitude within the preset period of time immediately before the shutdown device switches itself off, i.e., the pre-shutdown period. For a small power limit value, the Boost circuit generates the disturbance lasting for a short disturbance interval, or at least at a small rate, a low frequency and a small amplitude within the pre-shutdown period. However, it is necessary to apply the disturbance at least once within the pre-shutdown period.

Figure 10:
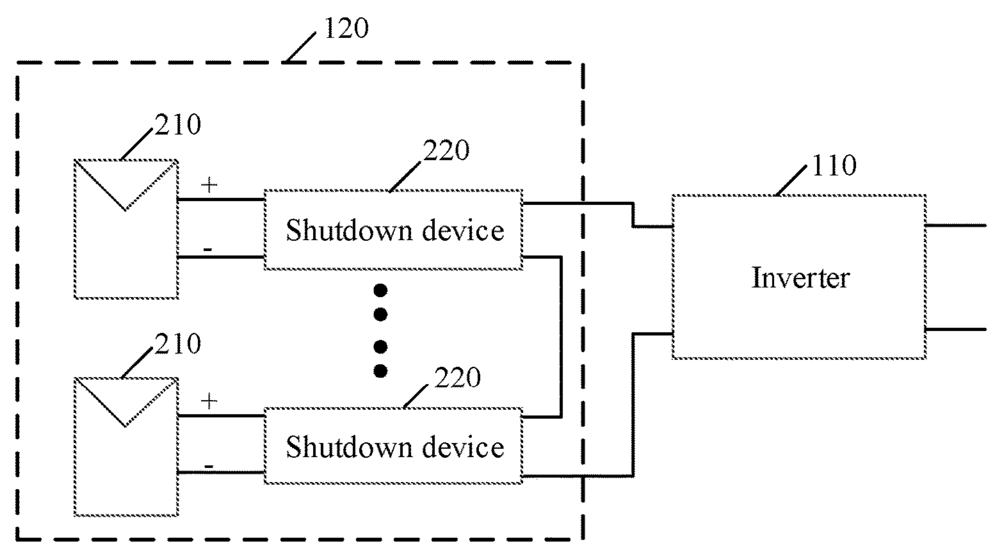
FIG. 10 is a schematic structural diagram illustrating the rapid shutdown system according to another embodiment of the present disclosure.

A rapid shutdown system is further provided according to an embodiment of the present disclosure. FIG. 10 illustrates a schematic structural diagram of the rapid shutdown system. The rapid shutdown system includes an inverter 110 and at least one photovoltaic string 120.

Input terminals of shutdown devices 220 in the photovoltaic string 120 are connected to respective photovoltaic modules 210. As shown in FIG. 10, the input terminal of one shutdown device 220 is connected to one photovoltaic module 210 or two photovoltaic modules (not shown in the drawings). Output terminals of the shutdown devices 220 are connected in series to form two terminals of the photovoltaic string 120, which are connected to a direct current end of the inverter 110 through a direct current bus. An alternating current end of the inverter 110 is connected to a grid. The inverter 110 cooperates with each of the shutdown devices 220 to implement the method for controlling the rapid shutdown system according to any one of the above embodiments.

Figure 11:
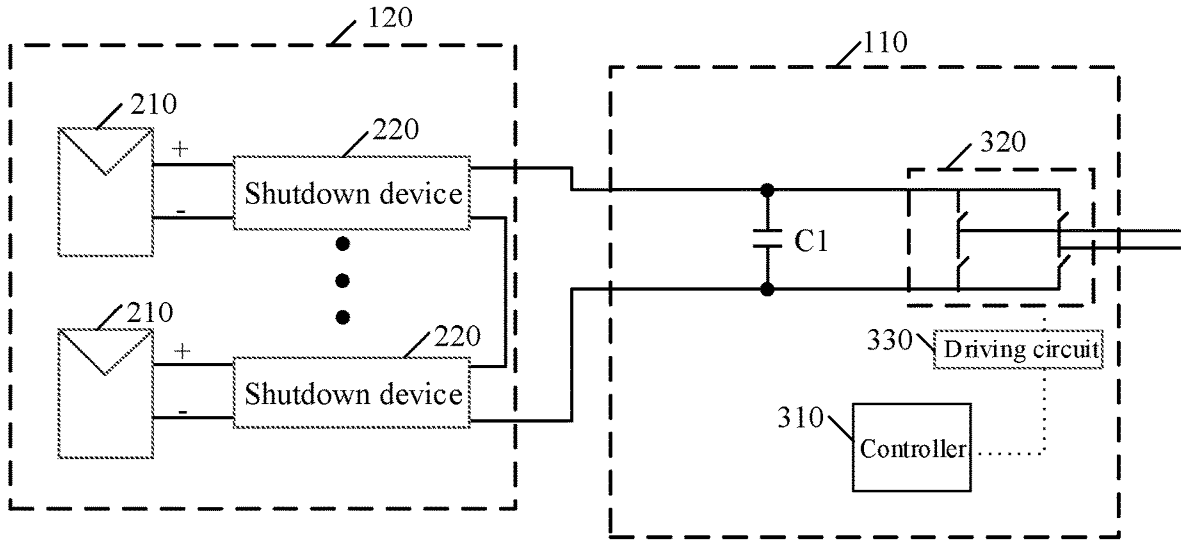
FIG. 11 and FIG. 12 each are a schematic structural diagram illustrating the rapid shutdown system according to another embodiment of the present disclosure.

In an embodiment, the inverter 110 is a single stage inverter, as shown in FIG. 11. The single-stage inverter includes a controller 310, an inverter circuit 320, a bus capacitor C1, and at least one driving circuit 330.

The inverter circuit 320 is connected in parallel with the bus capacitor C1 through a direct current bus of the inverter 110 at the input end of the inverter circuit 320. Output terminals of the inverter circuit 320 serve as the alternating current end of the inverter. An output terminal of the driving circuit 330 is connected to control terminals of respective switch transistors in the inverter circuit 320. The controller 310 is communicatively connected to each driving circuit 330, and is configured to send a control instruction to the driving circuit 330, so as to control the driving circuit 330 to output drive signals to the respective switch transistors in the inverter 110. It should be noted that a topology of the inverter circuit 320 may be an H bridge as shown in FIG. 11. That is, the inverter circuit 320 includes two branches that are connected in parallel. Two input terminals obtained by connecting the two branches serve as an input end of the inverter circuit 320. A cross-bar serves as an output end of the inverter circuit 320. In this case, the inverter 110 is single-phase. In practice, the inverter 110 may be three-phase. That is, the topology of the inverter circuit 320 may be a three-phase full bridge (not shown in the drawings). The topology of the inverter circuit 320 depends on practical situations, and various topologies of the inverter circuit 320 are within the protection scope of the embodiments of the present disclosure.

Figure 12:
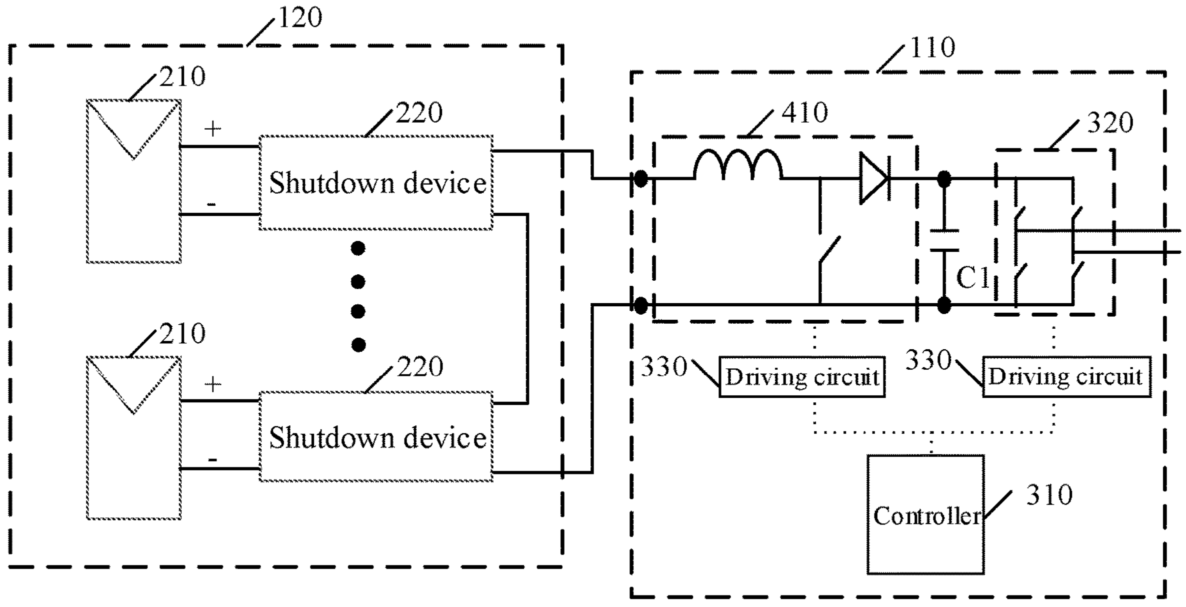

It should be noted that the inverter 110 may also be a two-stage inverter. That is, the inverter 110 further includes at least one Boost circuit 410 in addition to the controller 310, the inverter circuit 320, the bus capacitor C1, and the least one driving circuit 330. FIG. 12 illustrates a schematic structural diagram of the inverter 110 including one Boost circuit 410. In a case that the inverter 110 includes multiple Boost circuits 410, output terminals of the multiple Boost circuits 410 are connected in parallel to the direct current bus, i.e., with the bus capacitor C1, which is not repeated here. Input terminals of the Boost circuit 410 serve as a pair of direct current terminals of the inverter 110, and a positive output terminal and a negative output terminal of the Boost circuit 410 are connected to the two terminals of the bus capacitor C1 respectively. The controller 310 is connected to the control terminals of the respective switch transistors in the Boost circuit 410 through a corresponding driving circuit 330.

In practice, the switch transistors in the inverter circuit 320 are controlled by a driving circuit 330 different from a driving circuit 330 controlling the switch transistors in the Boost circuit 410. Alternatively, the switch transistors in the inverter circuit 320 and the switch transistors in the Boost circuit 410 are controlled by a same driving circuit 330 (not shown in the drawings).

The inverter 110 in the rapid shutdown system may be single-phase as shown in FIG. 10 to FIG. 12 or three-phase (not shown in the drawings). The electrical signal disturbance applied by the inverter 110 may be a voltage signal disturbance and/or a current signal disturbance, or a power signal disturbance.

Figure 13:
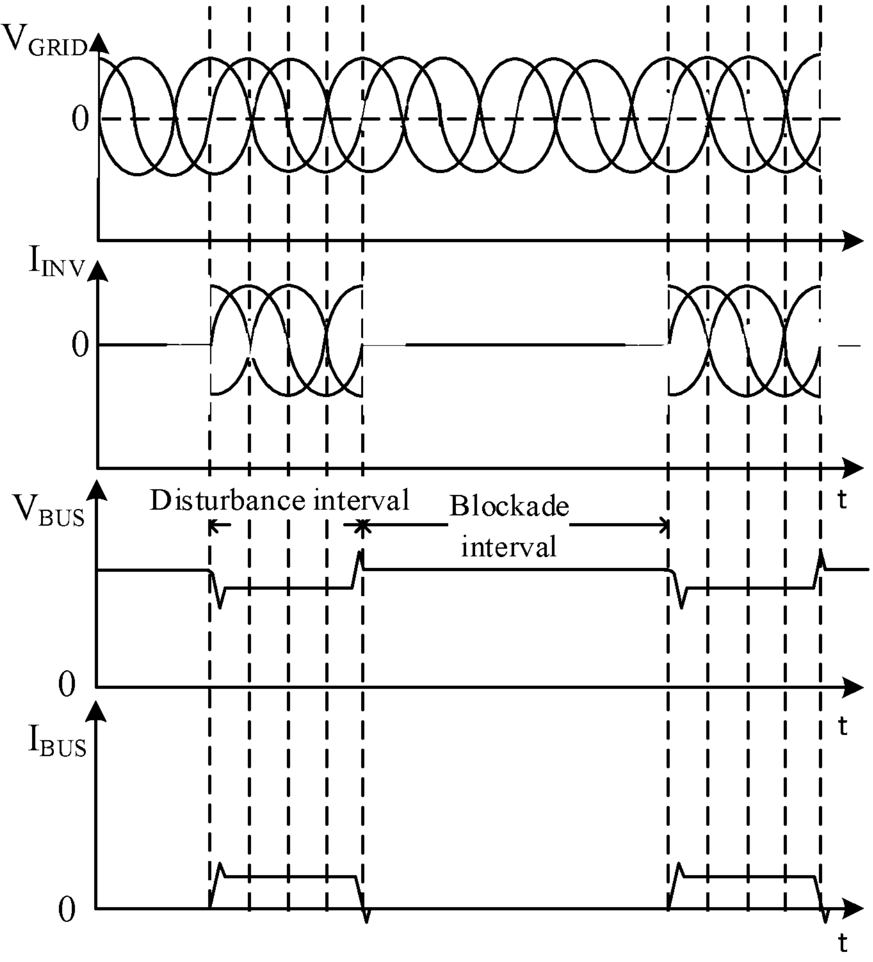
FIG. 13 to FIG. 15 each are a diagram illustrating a waveform of a current fed into the grid in a case that an inverter in the rapid shutdown system is a three-phase system according to another embodiment of the present disclosure.
Figure 14:
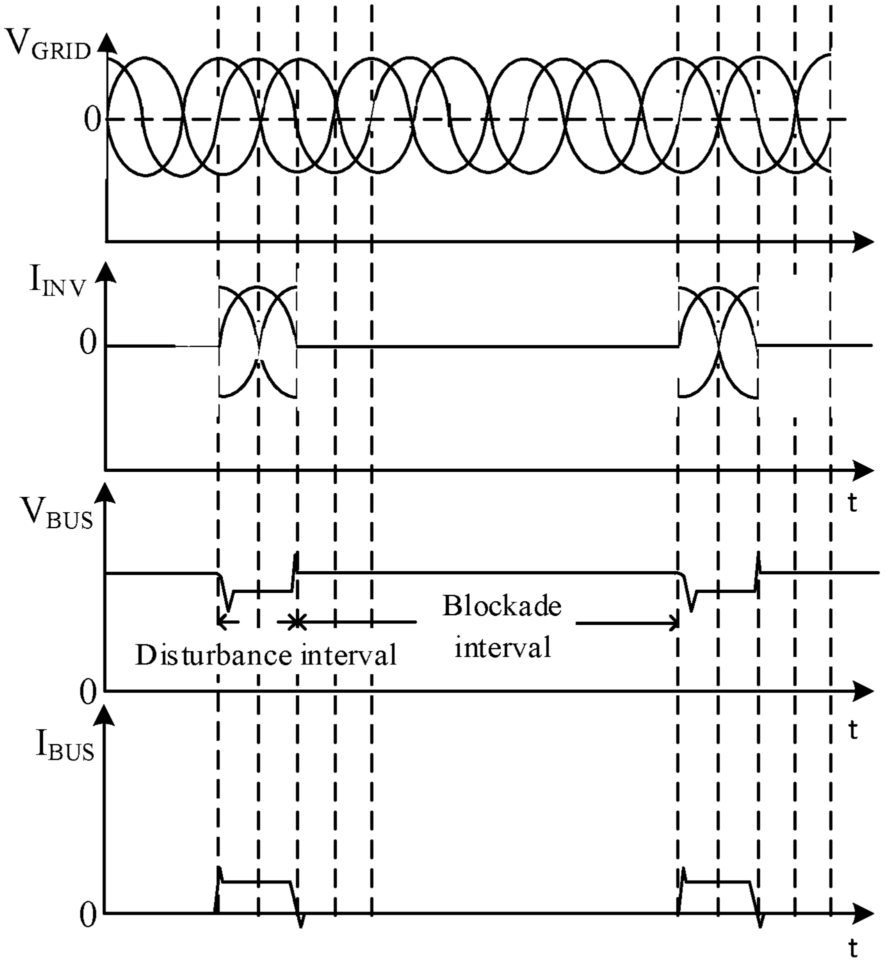
Figure 15:
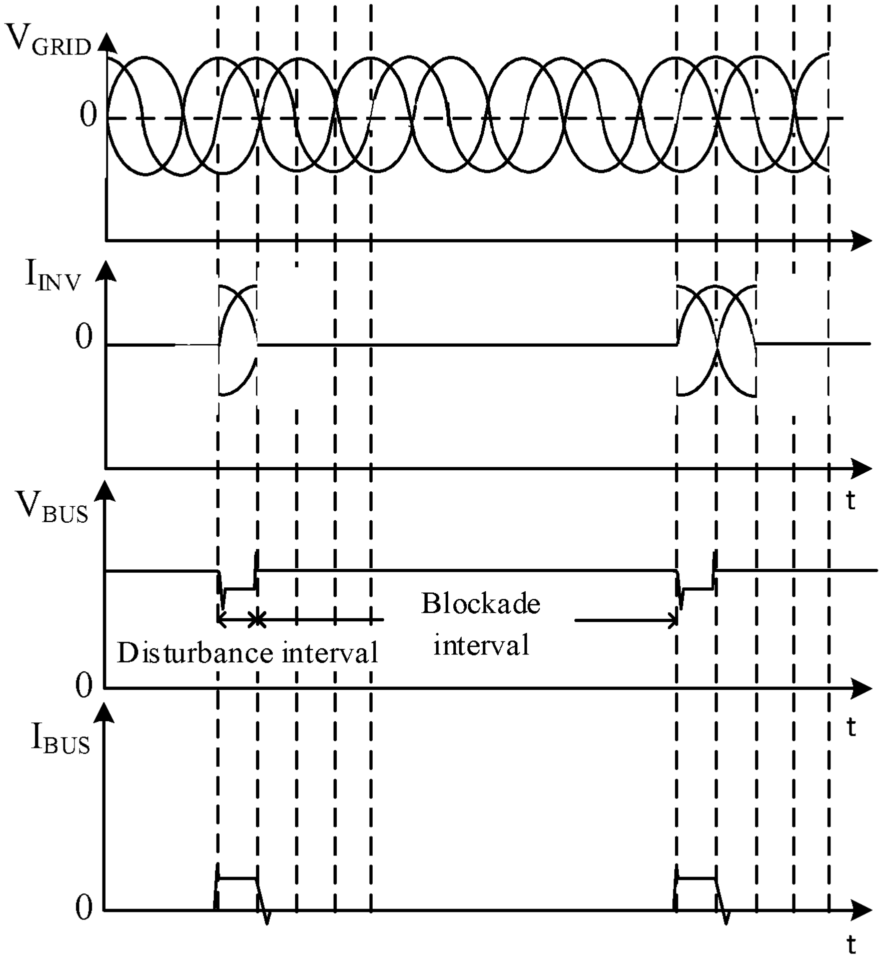

Description is made by taking the inverter controlling the inverter circuit in the inverter to apply the electrical signal disturbance as an example. The single-phase inverter feeds a single-phase current to the grid for a preset period of time, as shown in any one of FIG. 3 to FIG. 6. The three-phase inverter feeds a three-phase current $I_{INV}$ to the grid for a preset period of time, as shown in FIG. 13. In this case, the power on the direct current bus fluctuates, and the shutdown device remains in the ON state based on the sampled current flowing through the direct current bus, the sampled voltage across the direct current bus, or the sampled power on the direct current bus. It should be noted that the three-phase current $I_{INV}$ fed into the grid unnecessarily lasts for one entire period, but may last for a half of the period as shown in FIG. 14, or a quarter of the period as shown in FIG. 15. The present disclosure is not limited thereto, and how long does the three-phase current $I_{INV}$ fed into the grid last depends on the power limit, as long as the electrical signal disturbance can be applied at least once within each pre-shutdown period.

Other details are the same as the above embodiments, and are not described here.

The embodiments in this specification are described in a progressive manner, the same and similar parts among embodiments may be referred to each other, and each embodiment focuses on the differences from other embodiments. In particular, for the system or the embodiment of the system, since they are similar to the embodiment of the method, the description of the system or the embodiment of the system is simple, and reference may be made to the relevant part of the embodiment of the method. The above-described system and the embodiments of the system are only schematic. Units described as separate components may be or not physically separated. Components shown as units may be physical units or not, i.e. the components may be located in a same place or may be distributed among multiple network units. Some or all modules thereof may be selected to implement the solutions in the embodiments, depending in actual requirements. Those skilled in the art can understand and implement the embodiments without any creative work.

It may be known by those skilled in the art that, units and steps described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether these functions are performed in hardware or software depends on the specific application and design constraints for the technical solution. Those skilled in the art may use different methods to implement the described functions for each particular application, and such implementation should not be regarded as going beyond the scope of the present disclosure.

Based on the above description of the embodiments, features in the embodiments of this specification may be replaced or combined with each other, so that those skilled in the art can implement or use the present disclosure. Various modifications to the embodiments are obvious to those skilled in the art, and general principles defined in the present disclosure may be implemented in other embodiments without departing from the spirit or scope of the present disclosure. Therefore, the present disclosure shall not be limited to the embodiments described herein but have the widest scope that complies with the principle and novelty disclosed in this specification.

The invention claimed is:

1. A method for controlling a rapid shutdown system, comprising:

applying an electrical signal disturbance to a direct current bus connected to a shutdown device in the rapid shutdown system at least once within each pre-shutdown period of the shutdown device, by an inverter in the rapid shutdown system operating in a mode of limited power output;

sampling an input parameter and/or an output parameter of the shutdown device by the shutdown device and determining, by the shutdown device based on the sampled input parameter and/or the sampled output parameter, whether the electrical signal disturbance applied to the direct current bus meets a preset condition; and switching the shutdown device on or maintaining the shutdown device in an ON state, in response to a determination result that the electrical signal disturbance already meets the preset condition;

wherein the electrical signal disturbance is applied to the direct current bus through charging or discharging a bus capacitor in the inverter.

2. The method according to claim 1, wherein the inverter is a single-stage inverter comprising only an inverter circuit, and the applying the electrical signal disturbance to the direct current bus connected to the shutdown device in the rapid shutdown system at least once within the pre-shutdown period of the shutdown device comprises:

applying the electrical signal disturbance to the direct current bus connected to the shutdown device in the rapid shutdown system at least once within the pre-shutdown period by the inverter circuit under control of the inverter.

3. The method according to claim 1, wherein the inverter is a two-stage inverter comprising a Boost circuit and an inverter circuit, and the applying the electrical signal disturbance to the direct current bus connected to the shutdown device in the rapid shutdown system at least once within the pre-shutdown period of the shutdown device comprises:

sampling a voltage across the direct current bus of the inverter and determining whether the sampled voltage is greater than a preset voltage by the inverter;

operating the Boost circuit in a shoot through mode under control of the inverter and applying the electrical signal disturbance to the direct current bus connected to the shutdown device in the rapid shutdown system at least once within the pre-shutdown period by the inverter circuit under control of the inverter, in response to a determination result that the sampled voltage is greater than the preset voltage; and applying the electrical signal disturbance to the direct current bus connected to the shutdown device in the rapid shutdown system at least once within the pre-shutdown period by the Boost circuit under control of the inverter, in response to a determination result that the voltage is not greater than the preset voltage.

4. The method according to claim 3, further comprising: stopping outputting a PWM signal or performing an output at a preset duty ratio throughout a sub-period of time within the pre-shutdown period by the Boost circuit under control of the inverter while applying the electrical signal disturbance to the direct current bus connected to the shutdown device in the rapid shutdown system at least once within the pre-shutdown period, wherein the electrical signal disturbance is not applied during the period of time.

5. The method according to claim 2, wherein the applying the electrical signal disturbance to the direct current bus connected to the shutdown device in the rapid shutdown system at least once within the pre-shutdown period by the inverter circuit under control of the inverter comprises: feeding a current to a grid at least once within the pre-shutdown period by the inverter circuit, to charge or discharge the bus capacitor in the inverter, so as to apply the electrical signal disturbance to the direct current bus connected to the shutdown device in the rapid shutdown system.

6. The method according to claim 5, wherein the current fed into the grid by the inverter circuit has a same phase as a voltage of the grid.

7. The method according to claim 5, wherein the current fed into the grid corresponds to a full period, or a positive half-period and/or a negative half-period of a sine wave.

8. The method according to claim 1, wherein a preset duration, and at least one of the number of times, a frequency and an amplitude of the electrical signal disturbance applied by the inverter within the pre-shutdown period depend on a power limit set for the inverter in the mode of limited power output.

9. The method according to claim 1, wherein the electrical signal disturbance is a current signal disturbance and/or a voltage signal disturbance, or the electrical signal disturbance is a power signal disturbance.

10. The method according to claim 1, further comprising: maintaining the shutdown device in an OFF state in response to a determination result that the electrical signal disturbance does not meet the preset condition after the sampling the input parameter and/or the output parameter of the shutdown device by the shutdown device and determining, by the shutdown device based on the sampled input parameter and/or the sampled output parameter, whether the electrical-signal disturbance applied to the direct current bus connected to the shutdown device meets the preset condition.

11. A rapid shutdown system, comprising:

an inverter; and at least one photovoltaic string, wherein for each of the at least one photovoltaic string, input terminals of shutdown devices in the photovoltaic string are connected to respective photovoltaic modules, output terminals of the shutdown devices are connected in series to form two terminals of the photovoltaic string, and the two terminals of the photovoltaic string are connected to a direct current end of the inverter through a direct current bus;

an alternating current end of the inverter is connected to a grid; and wherein:

the inverter is configured to apply an electrical signal disturbance to the direct current bus connected to the shutdown devices at least once within each pre-shutdown period of the shutdown devices when the inverter operates in a mode of limited power output, a shutdown device of the shutdown devices is configured to sample an input parameter and/or an output parameter of the shutdown device determine, based on the sampled input parameter and/or the sampled output parameter, whether the electrical signal disturbance applied to the direct current bus meets a preset condition;

the rapid shutdown system is configured to switch the shutdown device on or maintain the shutdown device in an ON state, in response to a determination result that the electrical signal disturbance already meets the preset condition; and the electrical signal disturbance is applied to the direct current bus through charging or discharging a bus capacitor in the inverter.

12. The rapid shutdown system according to claim 11, wherein in a case that the inverter is a single-stage inverter, the inverter comprises:

a controller;

an inverter circuit;

a bus capacitor; and at least one driving circuit, wherein two terminals of the bus capacitor are connected to respective input terminals of the inverter circuit through a direct current bus of the inverter;

an output end of the inverter circuit serves as the alternating current end of the inverter;

an output terminal of the driving circuit is connected to control terminals of respective switch transistors in the inverter circuit; and the controller is communicatively connected to the driving circuit, and is configured to send a control instruction to the driving circuit for the driving circuit to output a drive signal to the switch transistors.

13. The rapid shutdown system according to claim 11, wherein in a case that the inverter is a two-stage inverter, the inverter further comprises:

at least one Boost circuit, wherein input terminals of the Boost circuit serve as a pair of direct current terminals of the inverter, and a positive output terminal and a negative output terminal of the Boost circuit are connected to two terminals of the bus capacitor respectively; and the controller is connected to control terminals of switch transistors in the Boost circuit through the driving circuit.

14. The rapid shutdown system according to claim 11, wherein the inverter is single-phase or three-phase.

15. The method according to claim 3, wherein the applying the electrical signal disturbance to the direct current bus connected to the shutdown device in the rapid shutdown system at least once within the pre-shutdown period by the inverter circuit under control of the inverter comprises:

feeding a current to a grid at least once within the pre-shutdown period by the inverter circuit, to charge or discharge the bus capacitor in the inverter, so as to apply the electrical signal disturbance to the direct current bus connected to the shutdown device in the rapid shutdown system.

16. The method according to claim 4, wherein the applying the electrical signal disturbance to the direct current bus connected to the shutdown device in the rapid shutdown system at least once within the pre-shutdown period by the inverter circuit under control of the inverter comprises:

feeding a current to a grid at least once within the pre-shutdown period by the inverter circuit, to charge or discharge the bus capacitor in the inverter, so as to apply the electrical signal disturbance to the direct current bus connected to the shutdown device in the rapid shutdown system.

17. The method according to claim 1, where the rapid shutdown system comprises at least one photovoltaic string.

* * * * *